Feb. 5, 1957            H. R. LEMPKE            2,780,471
PORTABLE KNOCKDOWN SHELTER FOR ICE FISHING
Filed June 3, 1954            2 Sheets-Sheet 2
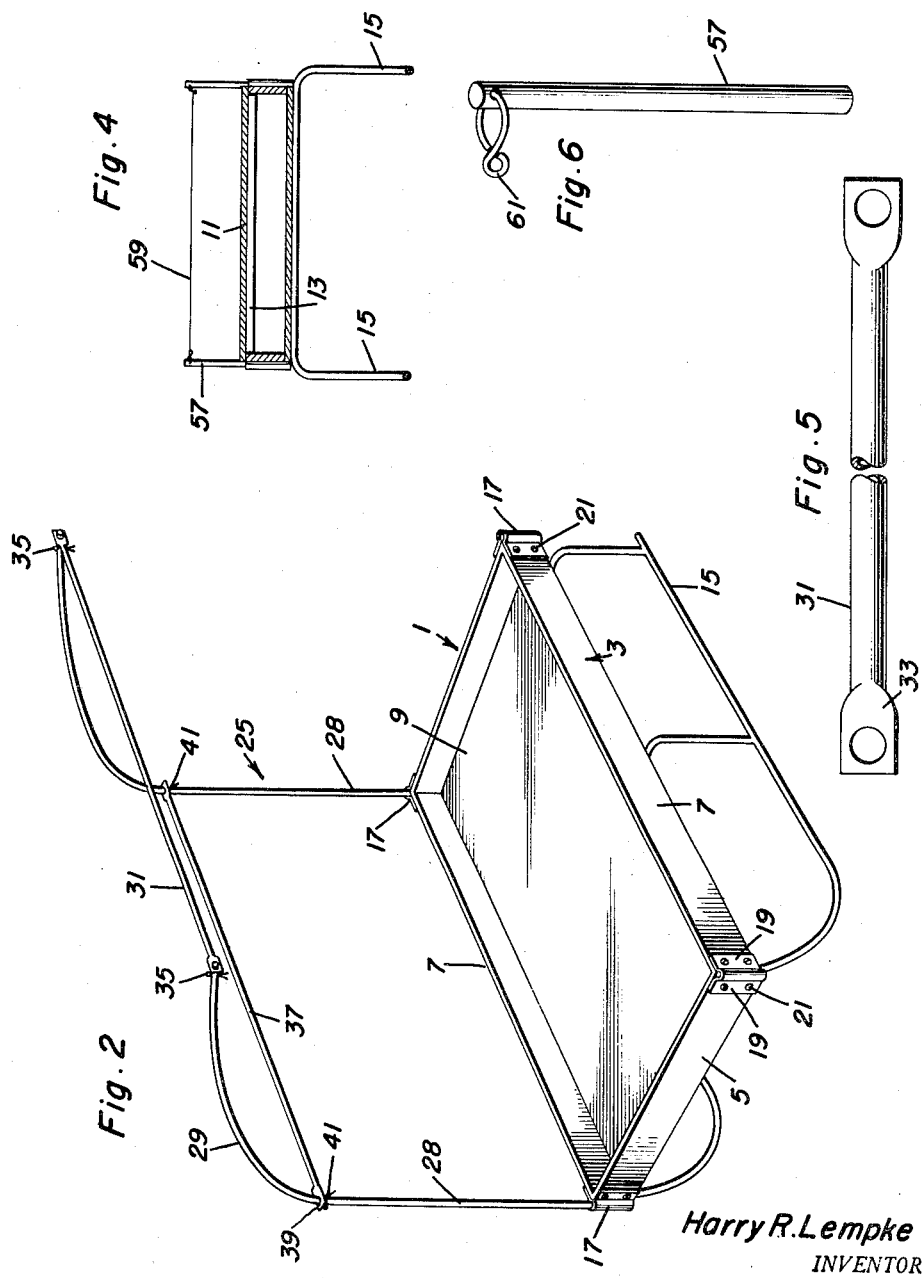
Harry R. Lempke
INVENTOR.
BY Clarence A. O'Brien
and Harvey B. Jacobson
Attorneys

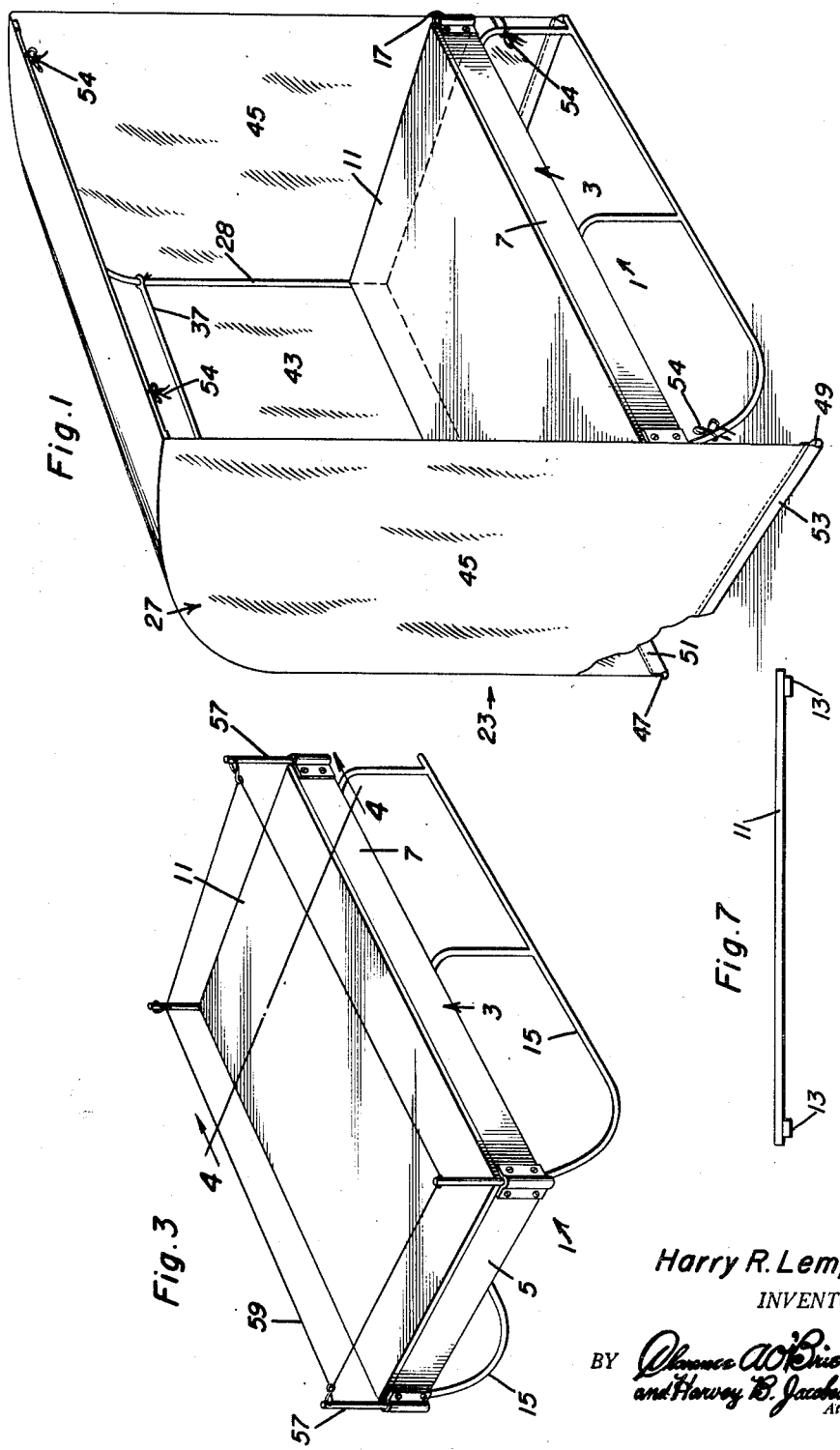

United States Patent Office 2,780,471
Patented Feb. 5, 1957

2,780,471

PORTABLE KNOCKDOWN SHELTER FOR ICE FISHING

Harry R. Lempke, Detroit, Mich.

Application June 3, 1954, Serial No. 434,114

1 Claim. (Cl. 280—12)

My invention relates to improvements in portable knockdown shelters for fishermen fishing through ice or for transporting over the ice equipment for such fishing.

The primary object of my invention is to provide a simply constructed combined sled and shelter affording a covered seat for a fisherman, and a runner supported box body for holding fishing equipment.

Another object is to provide a combined sled and shelter of the type and for the purposes above set forth and embodying a knockdown sheltering hood adapted to be quickly erected on the box body or knocked down and disposed in the box body for transporting thereby or storage therewith.

Still another object is to provide the box body with fence means rising therefrom to facilitate transporting on the sled such ice fishing accessories as minnow pails, a stove, and the like, and which can be easily erected on the box body or taken down for transporting in the box body along with the knocked down hood.

Other and subordinate objects together with the precise nature of my improvements will become apparent when the following description and claim are read with reference to the drawings accompanying and forming part of this specification.

In said drawings:

Figure 1 is a view in perspective partly broken away of my improved combined sled and shelter with the hood erected on the box body;

Figure 2 is a view in perspective of the sled illustrating the manner in which a frame of the hood is erected on the box body;

Figure 3 is a view in perspective illustrating the fence means erected on the box body;

Figure 4 is a view in transverse section taken on the line 4—4 of Figure 3;

Figure 5 is an enlarged view in plan partly broken away of one of the tie members;

Figure 6 is an enlarged view in perspective of one of the stakes of the fence means; and Figure 7 is an edge view of the cover.

Referring to the drawings by numerals, according to my invention a sled, designated generally by the numeral 1, is provided which comprises an elongated rectangular box body 3 having end and side walls 5, 7, a bottom 9, and a removable cover 11, seating on said walls 5, 7 and having bottom cross cleats 13 fitting between the side walls 5 and against the end walls 5 whereby to hold said cover in place. Skeleton side runners 15 of rod material are suitably fixed to the bottom 9.

The box body 3 is provided with external corner tubular sockets 17 having right angled flanges 19 straddling the corners of said box body 3 and by means of which and screws 21 said sockets are fixed in vertical upwardly opening position to the end and side walls 5, 7 for a purpose presently seen.

The hood designated generally by the numeral 23 comprises a hood frame 25 and a removable flexible covering 27 supported by the frame 25 and which is open at one side of the box body 3.

The hood frame 25 is formed of metal tubing and comprises a pair of uprights 28 having the lower ends thereof removably seating in the sockets at either side of the box body 3 and upper curved ends 29 arching across said body 3 to the opposite side of said body. A horizontal tie member 31 with flattened apertured ends 33 is detachably fitted at said ends over the upper terminals of the uprights 28 against detachable stop pins 35 in said terminals. A second horizontal tie member 37 ties the uprights 28 together intermediate their ends and is provided with flattened apertured ends 39 slidable on said uprights 28 to rest on removable cross pins 41 in said uprights 28. The tie members 31, 37 are alike and when the tie member 31 and pins 35 are detached, the tie member 37 may be slid into place on the pins 41 or removed off said uprights.

The flexible covering 27 is open at one side and drapes over the frame 25 with its open side at the side of the box body toward which the upper ends 29 of the uprights arch. As shown in Figure 1 the covering 27 forms a closed back 43 for the hood 27 at the opposite side of the box body 3 and ends 45 for the hood at the ends of said body and said back and ends are adapted to hang close to the ice and are weighted to hang taut by tubular weights 47, 49 in bottom hems 51, 53 in said back 43 and ends 45 of said covering 27.

Tie cords 54 are provided on said covering 27 at the front thereof for securement to the member 31 and runners 15 to hold the covering 27 in place. The weight of said covering 27 holds the tie member 31 in place.

As will be seen, the covering 27 may be removed from the frame 25 and folded for storing in the body 3 and the frame 25 knocked down by detaching tie members 31, 37 and pins 35, 41 from the uprights 28 and together with the latter stored in said body 3 all for transporting in said body by sledding, it being understood that the uprights 28 are proportioned to fit in said body. The cover 11 of course protects the covering 27, uprights 28, and other parts stored in the body 3 and forms a seat for a fisherman when the hood 23 is erected, in the manner which has already been described. As will be clear, in erecting the hood 23 the uprights 28 may be seated in the sockets 17 at either side of the body 3 so that the hood 23 will be open at either side of said body. As will also be clear, when the covering 27 is attached by the tie cords 54 to the tie member 3, the pins 35 may be removed and the tie members 31 slid back on the upper curved ends transversely of the box body 5, whereby to fold the upper portion of the hood 23 toward the back 43 and out of overlying relation to the box body. Also, the uprights 28 may be swung so that the curved free ends thereof are generally coplanar.

When the covering 27 of the hood 23 and the knocked down frame 25 are stored in the box body 3, accessories such as pails, a stove, or the like, may be transported on the sled 1 on the cover 11 within the confines of fence means comprising tubular stakes 57 connected at the upper ends thereof by wire 59 passed through links 61 on said upper ends and adapted to be erected by seating the lower ends of the stakes in the sockets 17. The fence means may be knocked down and stored when not in use in the box body 3.

A particular advantage of my invention is that it may be constructed for storing in an automobile trunk and for carrying under the arm when the hood parts and fence means are stored in the box body 3.

The foregoing will, it is believed, suffice to impart a clear understanding of my invention without further explanation.

Manifestly, the invention is susceptible of modification without departing from the inventive concept and right is herein reserved to modifications falling within the scope of the appended claim.

What is claimed is:

A portable shelter for ice fishermen comprising a sled having a rectangular body forming a seat, runners fixed to and supporting the body, a pair of corner sockets on said body at each of two opposite sides thereof, a pair of uprights having lower ends adapted to be seated in the pair of sockets at either side of the body and free upper curved ends arching over said body toward the opposite side and terminating above said opposite side, tie members connecting said uprights and having apertured flattened ends slidable on said uprights for sliding of said tie members onto and off of said free ends, a flexible covering supported by said uprights and detachably attached to one of said tie members and forming with said uprights and tie members a canopy open at said opposite side of the body, and having a back and an upper portion overlying said body, stop pins in said uprights for engagement by said flattened ends of said tie members to limit sliding of said tie members onto said uprights, the stop pins for said one tie member being removable, said one tie member when said stop pins therefor are removed being slidable on said upper free ends of said uprights to fold said upper portion of said covering toward said back portion and out of overlying relationship to said body and enabling said uprights to be swung to a position wherein the upper free curved ends thereof are approximately coplanar.

References Cited in the file of this patent
UNITED STATES PATENTS

| | | |
|---|---|---|
| 209,039 | Gregg | Oct. 15, 1878 |
| 465,489 | Nutting | Dec. 22, 1891 |
| 930,729 | Chambers | Aug. 10, 1909 |
| 1,240,006 | Austin | Sept. 11, 1917 |
| 1,409,316 | Smith | Mar. 14, 1922 |
| 1,722,533 | McWane | July 30, 1929 |
| 1,759,117 | Hopp | May 20, 1930 |
| 2,301,089 | Stevens | Nov. 3, 1942 |
| 2,464,884 | Noyes | Mar. 22, 1949 |
| 2,593,809 | Stoddard et al. | Apr. 22, 1952 |